March 5, 1963 E. WENNERBO 3,080,168

RECORD CHANGING PHONOGRAPH

Filed June 27, 1957 4 Sheets-Sheet 1

INVENTOR

ERIK WENNERBO

BY Irwin S. Thompson

ATTORNEY

INVENTOR
ERIK WENNERBO

BY Irwin S. Thompson
ATTORNEY

INVENTOR
ERIK WENNERBO
BY Irwin S. Thompson
ATTORNEY

March 5, 1963 E. WENNERBO 3,080,168

RECORD CHANGING PHONOGRAPH

Filed June 27, 1957 4 Sheets-Sheet 4

INVENTOR

ERIK WENNERBO

BY Irwin S. Thompson

ATTORNEY

United States Patent Office 3,080,168
Patented Mar. 5, 1963

3,080,168
RECORD CHANGING PHONOGRAPH

Erik Wennerbo, Motala, Sweden, assignor to Industriaktiebolaget Luxor, Motala, Sweden, a corporation of Sweden Filed June 27, 1957, Ser. No. 668,382
Claims priority, application Sweden June 27, 1956
2 Claims. (Cl. 274—10)

This invention relates to a device for such phonographs, as are provided with a record changing center spindle and is preferably intended to be used in that special sort of phonographs which is constructed for playing both records having large center holes and records having small center holes.

An important object of the invention is to eliminate the handling of an adaptor spindle with large diameter, which otherwise is used in the last mentioned phonographs and must be attached to the small sized spindle, when records with large center holes are to be played.

A preferred practical embodiment of the invention will now be described with reference to the accompanying drawings, in which.

Figures 1, 5:
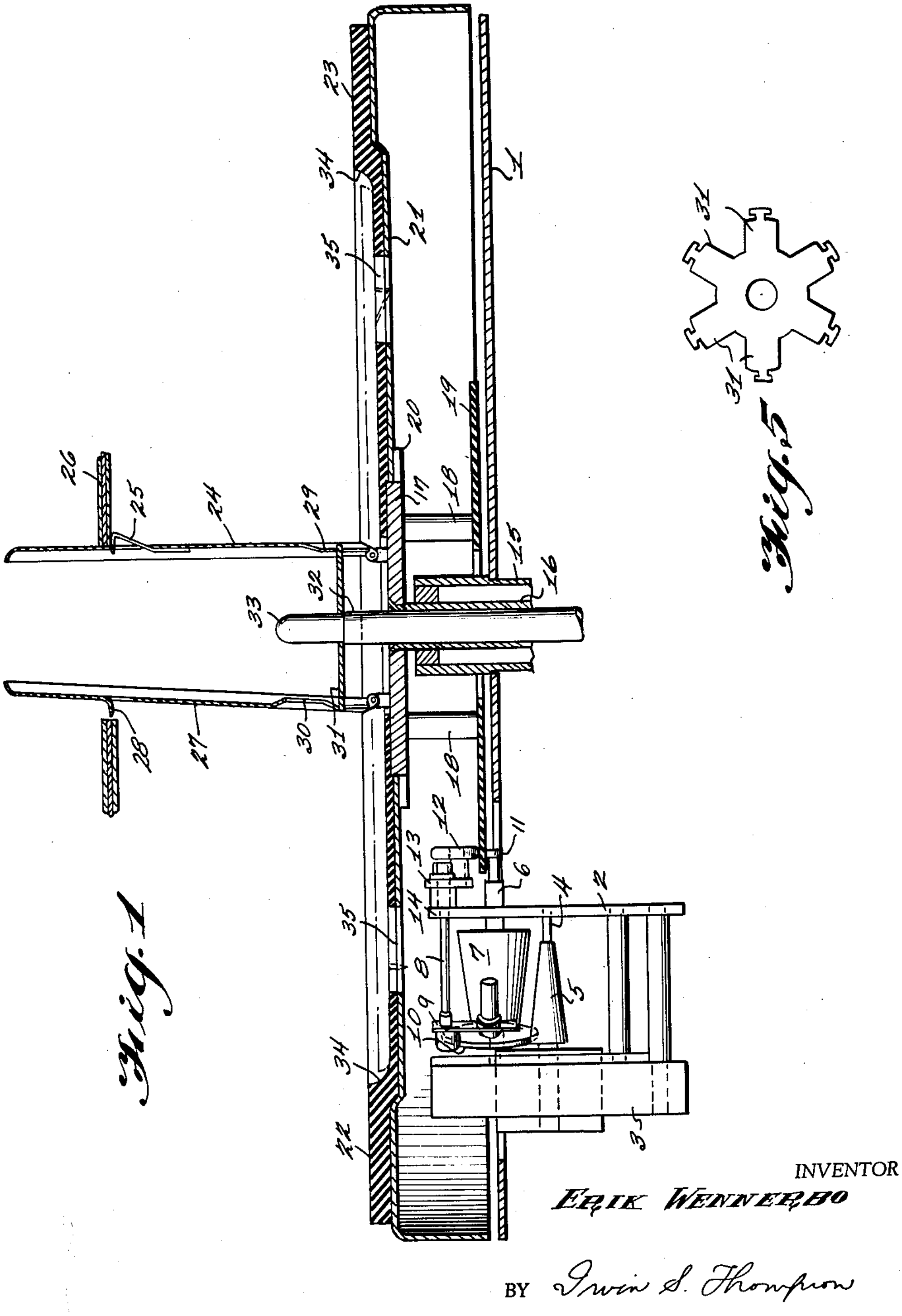
FIGURE 1 is a sectional side view of a phonograph including the device according to the invention and with the center spindle in one operative position.
Figure 2:
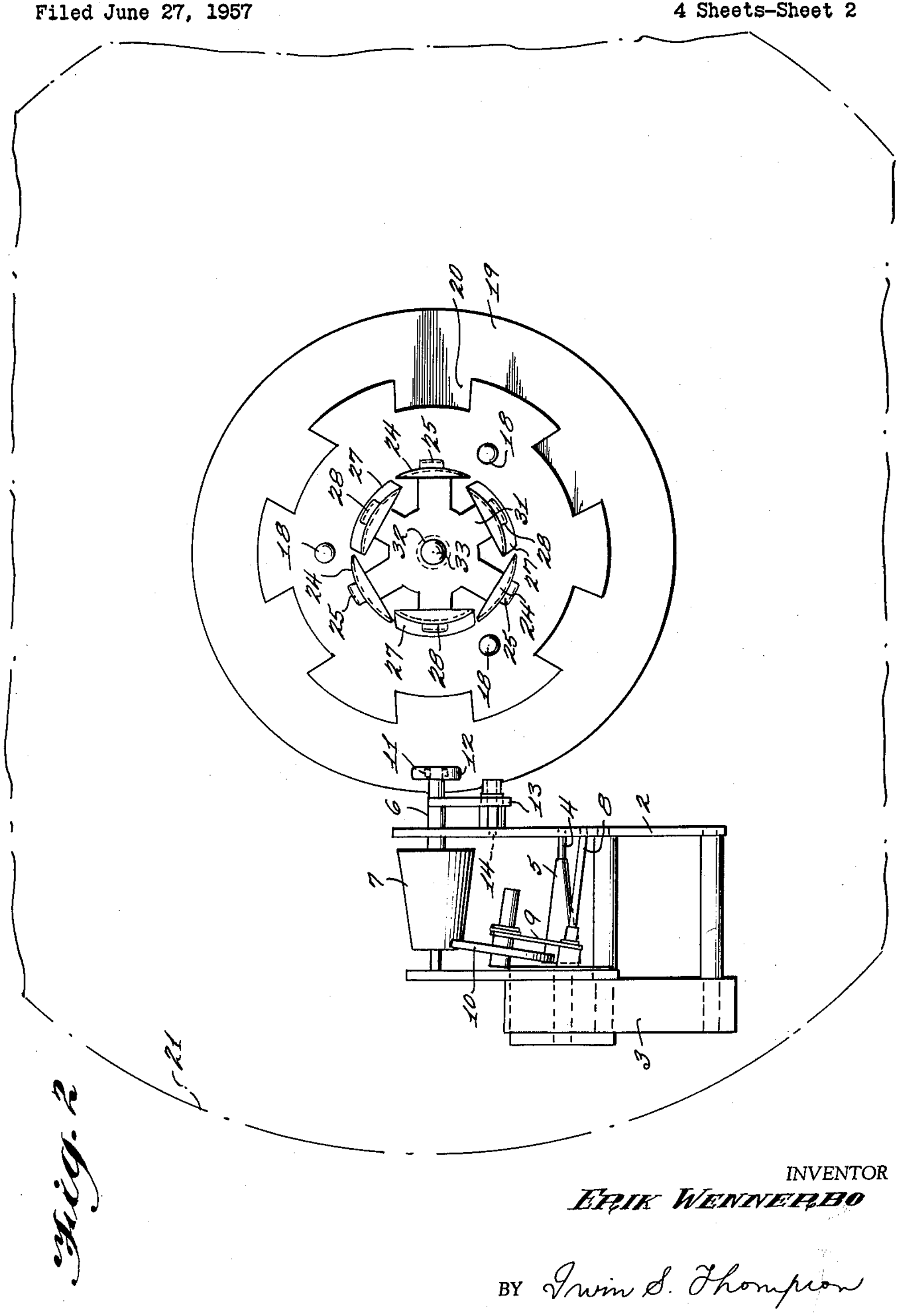
FIGURE 2 is a plan view of the same phonograph with the records and the turntable removed.
Figure 2:
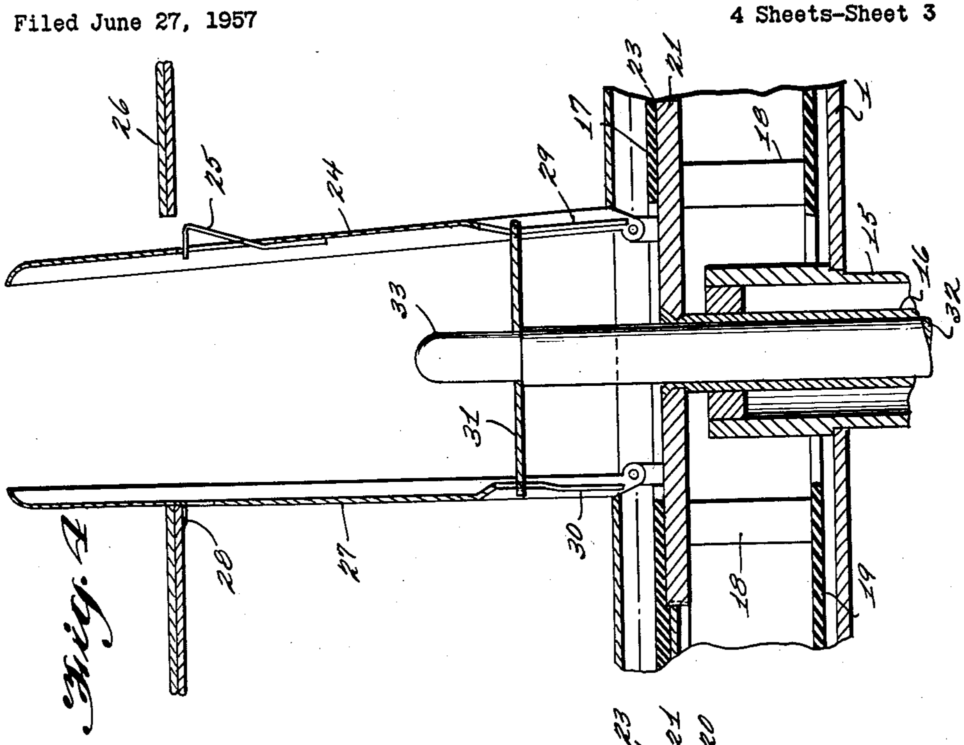
Figure 3:
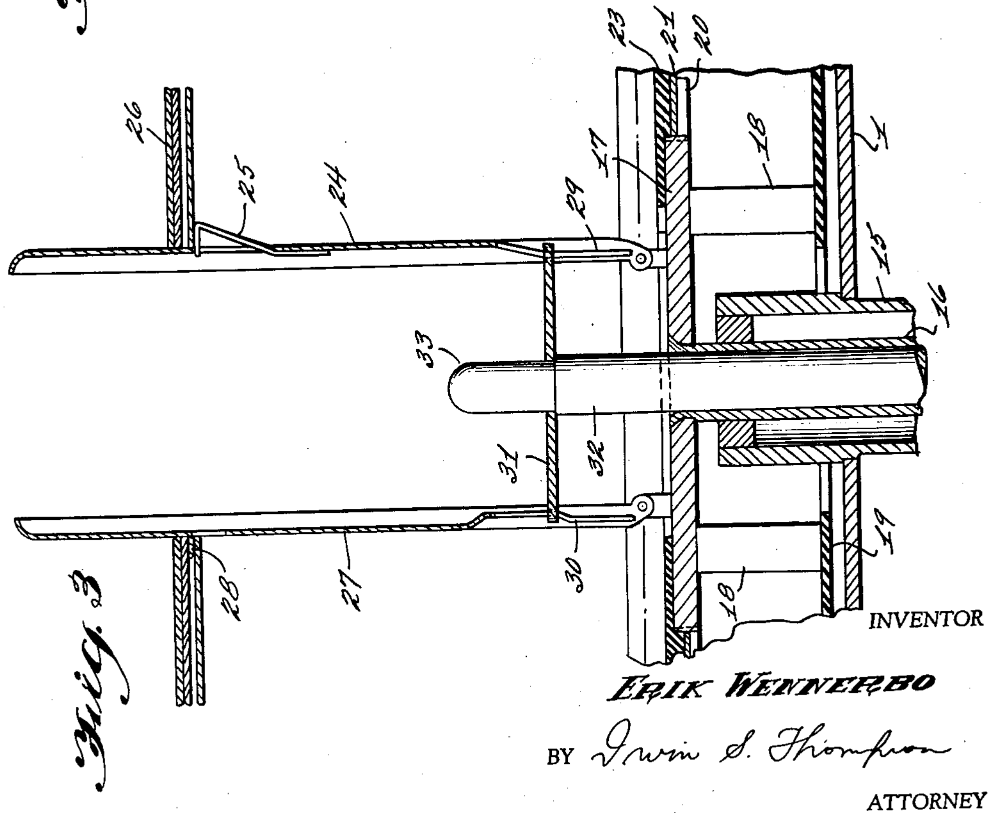
Figure 6:
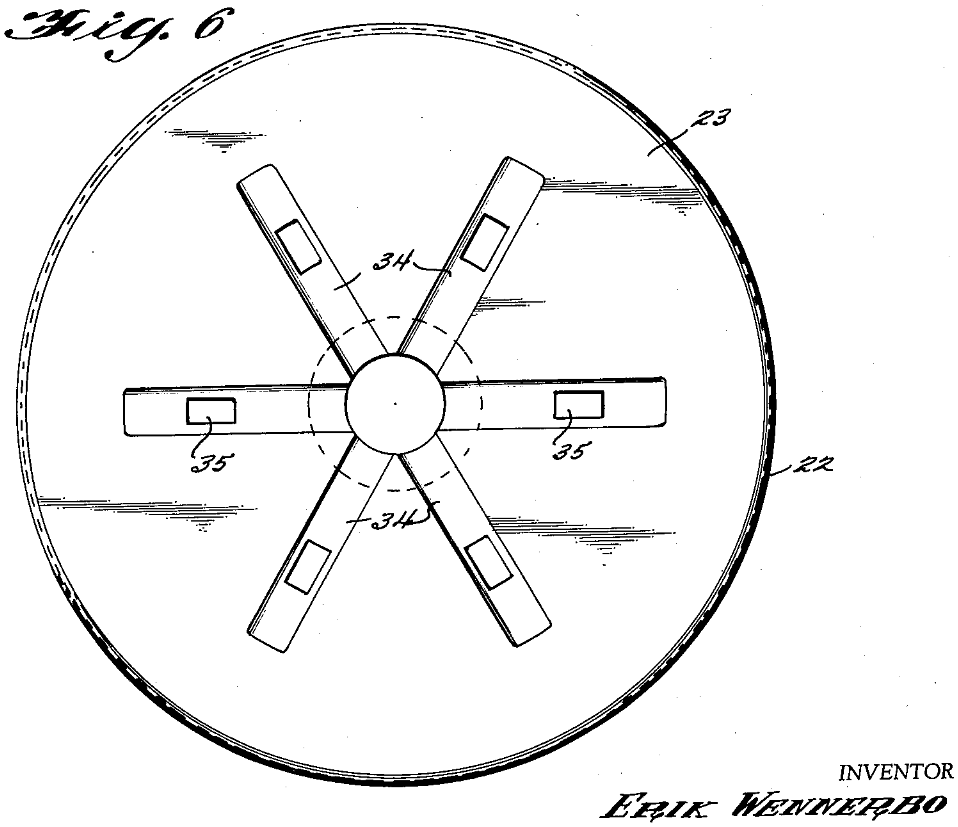

FIGURE 3 discloses the spindle according to FIGURE 1 in another operative position;

FIGURE 4 discloses the spindle according to FIGURE 1 in a third operative position;

FIGURE 5 is a plan view of a cam disc included in the device;

FIGURE 6 is a plan view of a turntable included in the device, and

Figure 7:
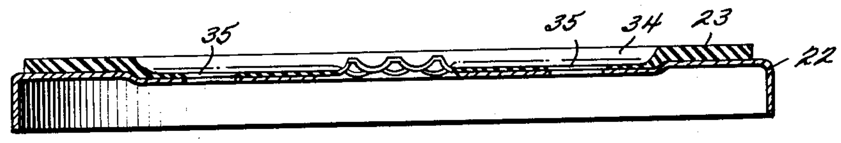

FIGURE 7 is a sectional side view of the turntable according to FIGURE 6.

In the drawings the reference numeral 1 designates the base plate of the phonograph, to which a motor support 2 carrying a motor 3 is secured. To the drive shaft 4 of the motor 3 there is fastened a cone 5. Another cone 7 is carried by a shaft 6, which is rotatably mounted in the motor support 2. These cones 5 and 7 are equally tapered and are arranged in such a relation to each other that the portions of their envelope surfaces, which face each other, are substantially parallel. A third shaft 8 is rotatably mounted in the motor support 2 and is angularly disposed in order to be parallel with the last mentioned portions of the envelope surfaces of the cones 5 and 7. About this shaft 8 there is pivotally arranged one end of an arm 9, which also is displaceable in the longitudinal direction of said shaft. The other end of the arm 9 carries an intermediate wheel 10 rotatably mounted therein. This wheel 10 preferably by means of a spring is in engagement with the two cones 5 and 7 and transmits the rotational movement of the cone 5 to the cone 7. This is done at different gear ratios due to the axial displacement position of the wheel 10.

The right end of shaft 6 extends outside the motor support 2 and is there shaped as a small drive roller 11. Above this roller there is a pressure roller 12, which is rotatably mounted in one end of an arm 13, the other end of which is swingable around a pin 14 secured to the motor support 2.

Inside a tube 15, fastened to the base plate 1, there is rotatably mounted a bearing 16, to the upper end of which is secured a disc 17. Downwards from this disc there extend three spacing bolts 18, to the lower end of which is fastened a rubber disc 19, which at its periphery is inserted between the rollers 11 and 12 to be rotated by means of the motor 3 driving the roller 11.

The disc 17 along its periphery is provided with recesses 20, which cooperate with downwardly directed projections made in a turntable 22, which at its center rests upon the disc 17. This means that the turntable supported by the disc 17 is in its rotational direction coupled to the disc but at the same time easily can be removed from the disc 17 and thus from the phonograph. The construction in a strict sense means that the turntable is divided into a fixed inner part and a loose outer part. It is in a normal way provided with a rubber mat 23.

On the disc 17 there are in a circle pivotally mounted six sections, which, when raised to a position where they are substantially perpendicular to the turntable plane together form a center spindle having a circumference corresponding to the large sized center hole. Every other such section 24 is provided with a shelf 25 for supporting a stack of unplayed records 26, whereas the three sections 27, which are located between the sections 24, are provided with a knife 28 to separate the lowermost record from the others in the stack. In the lower ends of the sections 24 and 27 there are formed cam shaped portions 29 and 30, in which slots are made. These extend in the longitudinal direction of the sections 24 and 27 and cooperate with the outer ends of a six-armed disc 31. This disc at its center is secured to a shaft 32, which is unrotatable but axially displaceable in relation to the bearing 16. The shaft 32 at its upper end is formed with a center spindle 33 for records having small center holes. The lower end of the shaft is in a manner not shown in engagement with a mechanism for effecting the record changing operation. Preferably the shaft 32 is also in engagement with the speed changing device of the phonograph in such a manner that by setting this device on other numbers of revolution than 45 r.p.m. the shaft 32 with the disc 31 is lowered effecting a swinging movement outwards of the sections 24 and 27. This movement is ended when the sections have arrived into special recesses 34 made in the rubber mat 23. In this position, which is shown chain-dotted in FIGURE 1, the sections are located below the upper plane of the rubber mat thus not obstructing the placing of records with small center holes onto the mat. In the bottom of the recesses 34 there are holes 35, made through the mat 23 and the turntable 22 to receive the shelves 25 of the sections 24 and the knives 28 of the sections 27.

The device operates in the following manner. As is disclosed by the foregoing the rotational movement of the motor 3 is transmitted to the drive roller 11 via the shaft 4, the cone 5, the intermediate wheel 10, the cone 7 and the shaft 6. Between the drive roller 11 and the pressure roller 12 the rubber disc 19 is inserted. Thus the rotational movement of the motor will be further transmitted to the disc 17 and the turntable 22 via the rubber disc 19 and the spacing bolts 18. Due to the fact that the center spindle consisting of the sections 24 and 27 is mounted on the disc 17 also this spindle with the record stack 26 will rotate when the phonograph is in use.

The device including the two cones 5 and 7 and the intermediate wheel 10 axially displaceable along them means that the rotational speed of the turntable can be adjusted continuously between the lowest and the highest of the speeds, which are actual for the phonograph records. It is preferably so arranged that the intermediate wheel 10 can be coarsely adjusted to certain definite positions, e.g. corresponding to 16⅔, 33⅓, 45 and 78 r.p.m. and that the intermediate wheel can be laterally displaced in both directions somewhat from these positions in order to enable fine adjustment of the speed.

When the speed control device is set in the position 45 r.p.m. in a manner not shown it affects the shaft 32 and moves it and the disc 31 upwards, the disc thereby through actuation upon the cam shaped portions 29, 30 of the sections 24 and 27 raising the latter ones from the position in chain dotted lines to the position in full lines according to FIGURE 1. The records 26 can now be placed upon the shelves 25 of the sections 24. In this position the sections 27 with their knives 28 are located within the center holes of the records 28.

When the record changing takes place the shaft 32 with the disc 31 is by the record changing mechanism raised somewhat upwards from the position according to FIGURE 1 to the position according to FIGURE 3. Thereby through actuation of the disc 31 upon the cam shaped portion 30 the sections 27 are turned somewhat outwards, so that their knives are intruded between the lowermost and the lowermost but one record in the stack, whereas the position of the sections 24 is unchanged.

By a further axial displacement upwards of the shaft 32 and the disc 31 the latter actuates the cam shaped portion 29 of the sections 24 so that these members are turned inwards to the position according to FIGURE 4, while the sections 27 are still in their position according to FIGURE 3. The lowermost record in the stack has now lost its support and falls down onto the turntable to be played. The other records in the stack are still supported by the knives 28 of the sections 27.

After that the shaft 32 and the disc 31 are lowered effectuating a returning of the sections 24 and 27 from the position according to FIGURE 4 to the position according to FIGURE 1, thus completing the changing cycle. The device is now prepared for the next changing cycle.

When the speed changing device is adjusted in position other than 45 r.p.m. the shaft 32 and the disc 31 in the manner described before are lowered so far that the sections 24 and 27 after an outwards swinging movement are brought down into the recesses 34 of the turntable 22, in which they do not obstruct the placing onto the turntable of records having small center holes. In this position of the shaft 32 its pin shaped upper part 33 protrudes far enough above the upper plane of the turntable to serve as a center spindle for the last mentioned records.

The device herein described is intended for automatically changing only of records having large center holes while records with small center holes are manually changed. It is of course possible instead of the pin 33 to use a record changing spindle having small diameter for automatically playing also of records with small center holes.

What I claim is:

1. A phonograph for reproducing information from record discs having a large indexing aperture, comprising: a rotatable turntable unit having a record supporting surface provided with a plurality of radially extending recesses; a record changing assembly including an automatic large diameter spindle for storing said record discs in stacked form above said turntable and individually dispensing said discs onto said record supporting surface, said spindle comprising a corresponding plurality of separate sections pivotally fixed to a central portion of said turntable unit and respectively retractable to a rest position within said receses and extendible to a raised position above said surface, said sections being even in number, every other section of said sections being provided with shelves for supporting said record stack above said turntable while every other section of said sections is provided with knives for separating, during the dispensing action, the lowermost record from the others of the stack; and slidable guiding means for actuating said sections, said guiding means through a first movement swinging the sections from their rest position to their raised position with the shelf sections in active and the knife sections in inactive positions, through a second movement swinging the shelf sections from active to inactive positions and the knife sections from inactive to active positions, through a third movement swinging the shelf sections back to active positions and the knife sections back to inactive positions and through a fourth movement swinging all the sections back to their rest position.

2. A phonograph according to claim 1 in which said guiding means include cam means disposed in said sections, a small axially movable spindle disposed centrally of said turntable unit, disc means fixedly connected to and movable with said small spindle, said disc means engaging said cam means to effect said movements upon axial movement of said small spindle.

References Cited in the file of this patent

UNITED STATES PATENTS

| | | |
|---|---|---|
| 2,643,127 | Gregg et al. | Jan. 23, 1953 |
| 2,666,648 | Dale | Jan. 19, 1954 |
| 2,688,490 | Schumaker | Sept. 7, 1954 |
| 2,761,686 | Stalling | Sept. 4, 1956 |